(12) United States Patent
Bunnell et al.

(10) Patent No.: US 6,789,568 B1
(45) Date of Patent: Sep. 14, 2004

(54) FLUID FLOW CONTROL MECHANSIM

(75) Inventors: Michael Bunnell, Clarendon Hills, IL (US); Daniel Karlak, Crystal Lake, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/463,655

(22) Filed: Jun. 17, 2003

(51) Int. Cl.⁷ .......................... F02M 37/00; F16K 15/03
(52) U.S. Cl. .................. 137/527.8; 137/265; 137/527; 137/899
(58) Field of Search ............................... 137/899, 265, 137/511, 527, 527.8, 571

(56) References Cited

U.S. PATENT DOCUMENTS

| | | | | |
|---|---|---|---|---|
| 3,254,697 A | * | 6/1966 | Parks | 137/265 |
| 4,288,086 A | * | 9/1981 | Oban et al. | 137/571 |
| 4,664,144 A | * | 5/1987 | Lemmon | 137/571 |
| 2003/0116192 A1 | * | 6/2003 | Svendsen et al. | 137/265 |

FOREIGN PATENT DOCUMENTS

JP           406001153 A   *   1/1994   ................. 180/314

* cited by examiner

*Primary Examiner*—Kevin Lee
(74) *Attorney, Agent, or Firm*—Collin A. Webb; John William Stader

(57) ABSTRACT

A fluid flow control mechanism includes a crossover fuel assembly which controls fuel flow between tanks such that an engine fuel intake pipe remains submerged. It is for a work vehicle with a fuel system which has two tanks, three flexible couplings, a tube assembly and a valve assembly. The crossover fuel assembly includes a suction tube assembly, a check valve assembly, a connecting polymeric or elastomeric coupling and multiple clamping mechanisms. The engine fuel intake pipe fluidly connects the crossover fuel assembly to the engine.

18 Claims, 4 Drawing Sheets

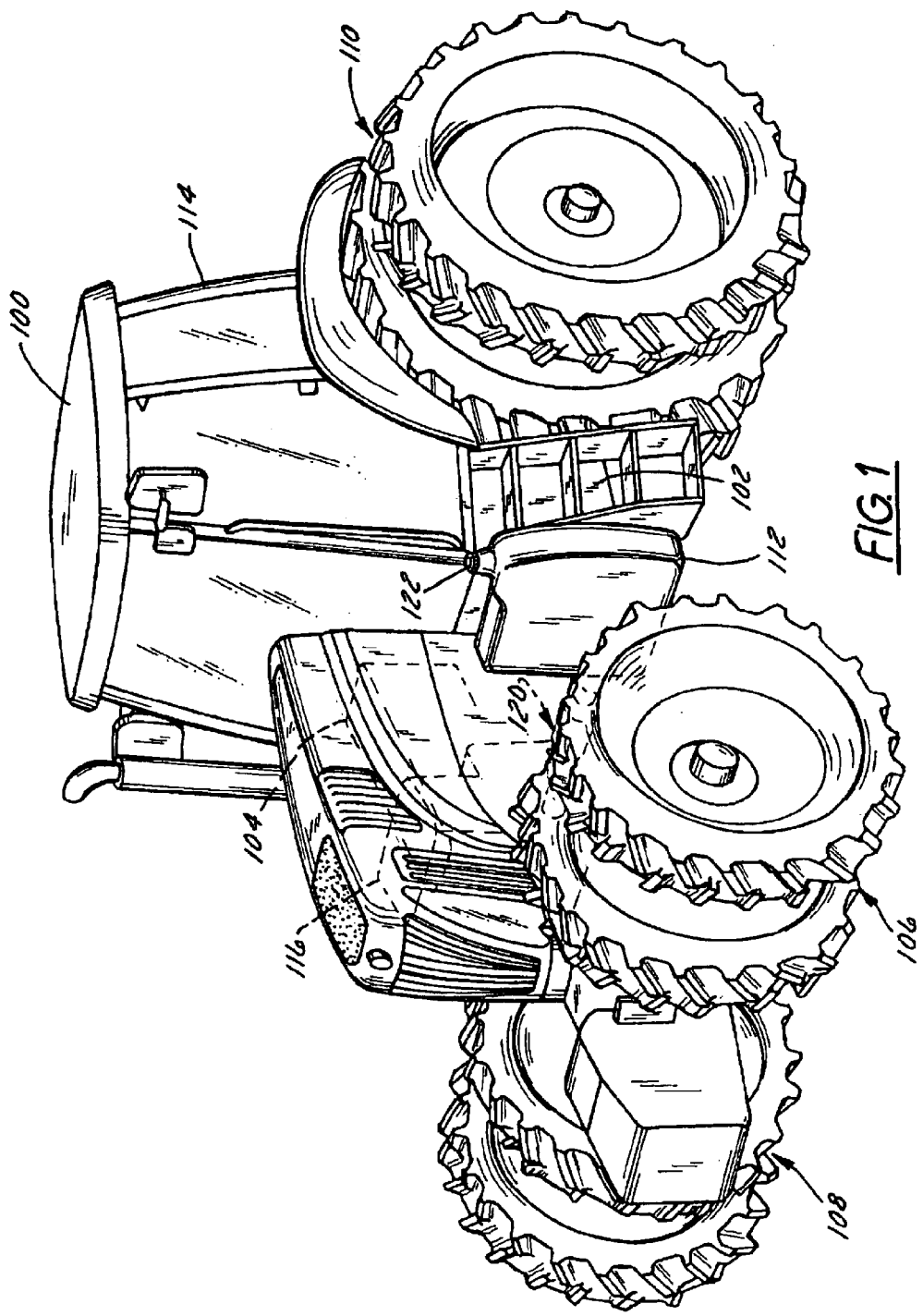

FLUID FLOW CONTROL MECHANSIM

FIELD OF THE INVENTION

This invention relates to fuel systems for work vehicles. More particularly it relates to crossover fuel transfer assemblies for work vehicles having multiple fuel tanks. More particularly it relates to tractors having two tanks connected by a fuel crossover pipe.

BACKGROUND OF THE INVENTION

Work vehicles, whether for agricultural or construction use, are often operated on very irregular ground. Typical work locations are much removed geographically from service providers, therefore robustness and simplicity of design are appreciated in order to limit service instances. Operators generally remain on the vehicle for hours at a time, with complex control systems at their command.

These vehicles sometimes travel long distances, requiring multiple fuel tanks to enable long operational periods. The fuel tanks are generally located on the left and right sides of the vehicle, with a fuel crossover pipe located between them. The fuel is transferred from the tanks to the engine in a centralized location, usually between the left and right tanks. When the vehicle is operating in a level (horizontal) position, this poses no problem. However, in many cases, work vehicles used for agricultural or construction operate in widely varying terrain conditions, uphill and downhill, and along the side of hills. This operation frequently results in fuel flowing naturally away from the intake pipe to the lower tank. When the fuel level falls below the fuel intake pipe, the vehicle ceases to function. This can occur even when there is substantial fuel in the tanks.

Inventors have sought to remedy this false out-of-fuel situation using different methods. Some have added a fuel intake pipe for each tank, which represents substantial extra piping. Manual switches that switch between the first and second tanks are common on trucks and delivery vans. However these methods do not provide an automatic means of keeping fuel near the fuel intake pipe, using very few extra components.

What is needed therefore is a system that compensates for the normal flowage of fuel away from the fuel intake point, keeping fuel continually available for consumption by the work vehicle engine, regardless of the pitch of the vehicle on a slope. What is also needed is a simple control mechanism with the least amount of parts. What is also needed is an automatic control mechanism that does not require manual intervention. It is an object of this invention to provide one or more of these benefits in one or more of the embodiments described below.

SUMMARY OF THE INVENTION

In accordance with a first embodiment of the invention, a crossover fuel assembly for a work vehicle is provided. The first embodiment uses a check valve assembly, a flexible polymeric or elastomeric tube, and a suction pipe assembly. In a second and third embodiment, the crossover fuel assembly is located between two fuel tanks. A fuel intake pipe may connect the suction pipe assembly to the fuel pump, creating a fluid connection between the fuel system and the engine. The check valve assembly may use a simple flapper valve located between the two fuel tanks to catch the fuel and prevent it from flowing to the tank farthest from the fuel intake pipe. In one embodiment, plastic tanks may be laterally disposed on the left and right side of the vehicle and generally disposed fore-and-aft between the front and rear wheels. Connections between the check valve assembly, the suction pipe assembly and the tanks may be made with flexible polymeric or elastomeric couplings with an opening at each end. Hose clamps may be used to clamp the flexible couplings to the assemblies and tanks.

BRIEF DESCRIPTION OF THE DRAWINGS

The detailed description particularly refers to the accompanying FIGURES in which:

FIG. 1 is a perspective view of an agricultural tractor having a fuel system in accordance with the present invention.

DETAILED DESCRIPTION OF THE PREFERRED EMBODIMENT

Figure 3:
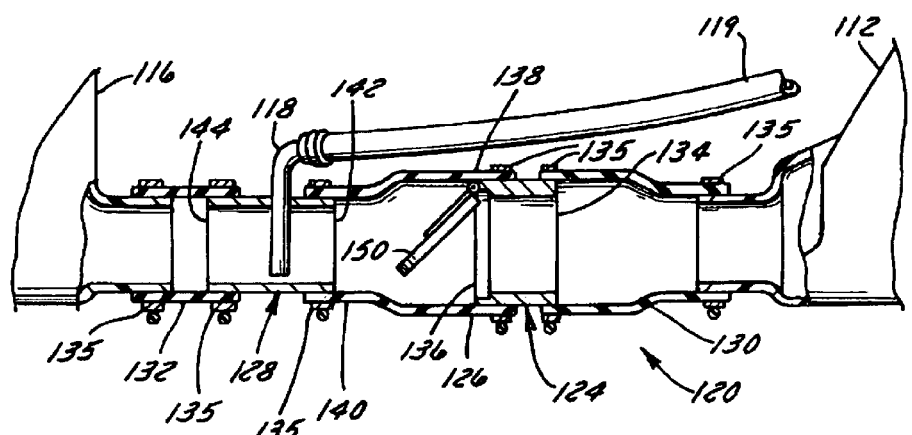
FIG. 3 is a fragmentary cross sectional front view of the fuel system of FIGS. 1–2 showing the crossover fuel assembly including the suction tube assembly, check valve assembly, and polymeric tubes.

FIG. 1 shows a tractor 100, which includes a chassis 102 with an engine 104. The tractor 100 is supported by a left front wheel assembly 106, a right front wheel assembly 108, a left rear wheel assembly 110, and a right rear wheel assembly (not shown). The engine 104 is connected to a left fuel tank 112, a right fuel tank 116, and an operator compartment 114 in which the operator controls are provided.

The tractor 100 may have various modifications from what is described in these teachings, including a front-mounted apparatus for ground contact and manipulation for example a blade or bucket, vertical drill or pneumatic hammer. The tractor may also have a rear-mounted apparatus such as a backhoe. Additionally, the tractor may be attached to a tow-behind ground manipulation apparatus such as a harrow, plow or seed planter, or a payload (crop) manipulation apparatus such as a hay baler. This may restrict the operator access to the front or rear of the vehicle, while leaving the sides easier to access under normal operating conditions.

The operator sits in the operator compartment 114 and does not have immediate physical access to the fuel system while the vehicle is moving. Routine operator maintenance including liquid refilling such as fuel and oil are performed while the vehicle is stationary. The operator has generally unobstructed view in a horizontal plane, as well as reasonable view of the ground near the vehicle. This is necessary as the vehicle is typically used for ground manipulation in some fashion. It is desired that the operator stay in the operator compartment with the vehicle moving for long periods of time in order to achieve the highest operational efficiency. Therefore controls for internal systems such as fuel supply and external systems such as plows are preferably automatic or accessible from within the operator compartment.

The tractor is equipped with an engine 104 necessary for movement of the vehicle, attached apparatus, and a variable payload. Such engines consume large amounts of typically diesel fuel and must be capable of operating in extreme temperature and humidity conditions. The nature of the preferred weight and mass distribution in the tractor is such that their engine typically extends forward from the operator compartment and ends near the front wheel assemblies. In the FIG. 1, this leaves ample room for left 112 and right 116 mounted fuel tanks that are operator accessible upon departure from the operator compartment.

The preferred location for the tanks is for the left fuel tank 112 to be located generally between the left front wheel assembly 106 and the left rear wheel assembly 110, and the right fuel tank 116 to be located generally between the right front wheel assembly 108 and the right rear wheel assembly. The preferred embodiment includes two tanks, however more than two tanks may be used. The tank location is also low enough so as to not impede the operator view while operating the vehicle.

The tanks in the preferred embodiment are preferably manufactured from blow-molded or roto-molded plastic, however there are other well known structural materials used in the art. The emphasis is on ruggedness, reliability and ease of maintenance. Welded steel may be used in tank manufacture.

The wheel assemblies (106, 108, and 110) shown in FIG. 1 show two large diameter wheels in each assembly. The right rear wheel assembly is arranged and oriented the same as the left rear wheel assembly. The number of wheels in an assembly is variable and is typically determined by a combination of factors including the work that is being performed, the consistency of the terrain (mud, gravel, packed dirt), and the payload being carried. It is also common to have a single wheel in each of the front assemblies or rear assemblies.

Figure 2:
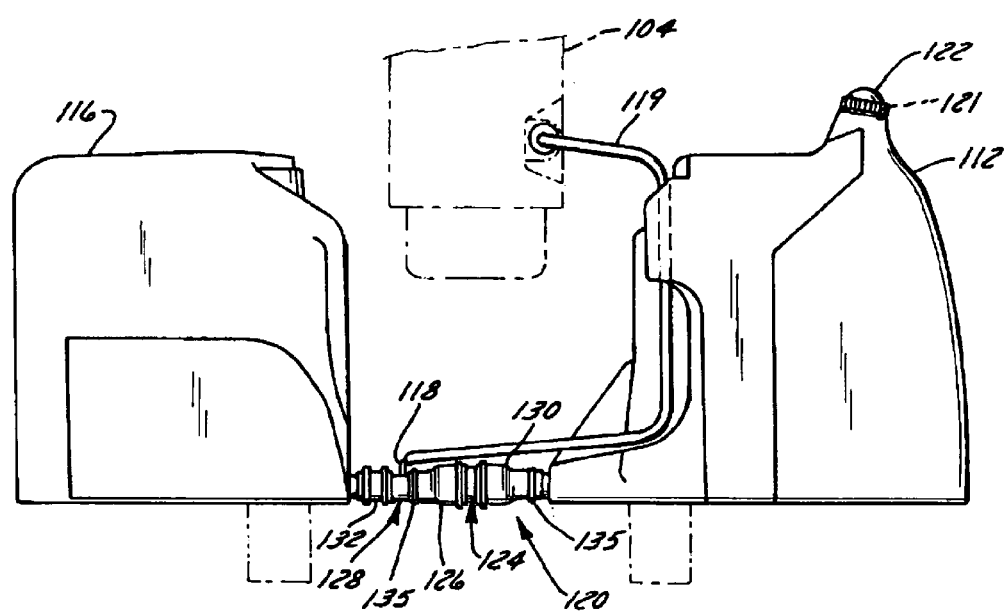
FIG. 2 is a front view of the fuel system of the tractor of FIG. 1 with the engine shown in phantom lines.

The fuel system shown in FIG. 2 consists of the left tank 112 and the right tank 116 connected by a crossover fuel assembly 120. A fluid connection from the fuel system to the engine is provided by the fuel intake pipe 118 that connects the crossover fuel assembly 120 to a fuel line 119, said fuel line in fluid connection with fuel intake pipe 118 and engine 104. Engine 104 sucks fuel up through pipe 118 from the crossover fuel assembly 120 to the engine 104. Fuel is initially inserted into the fuel system through an opening 121 in the top of the left fuel tank which is then closed by a fuel tank cap 122.

The power requirements and resulting size and central fore-and-aft displacement of the engine have been previously described. In FIG. 2 the section of the engine into which the fuel intake pipe connects is located between the left and right tanks. It is supported by the tractor's chassis, which extends longitudinally between the two tanks. Thus the need for separate tanks is clear, providing adequate room for the engine to extend between them. The fuel intake pipe in this embodiment also extends from the top of the crossover fuel assembly, which is the preferred method.

Though FIG. 2 shows a left-right tank configuration, the tanks may also be configured fore-and-aft such that one tank is located forward of the other tank. The crossover fuel assembly extends longitudinally between the two fore-and-aft tanks to provide the same function as it does here. For this reason the invention is not limited to any particular arrangement of fuel tanks unless explicitly recited in the claims.

In this embodiment, there is only one fuel tank cap, at the top of the left tank, which covers a single opening through which both tanks are filled. When fuel enters the left fuel tank the fuel continues through the crossover fuel assembly filling the right fuel tank also. It is also possible to have a fuel tank opening on the top of each fuel tank. In the case of several fuel tanks there may be several fuel tank openings. The preferred method uses a single fuel tank opening for ease of refueling by the operator.

The same assembly of left and right tanks and crossover assembly may also be used to dispense liquid other than fuel. Water and chemicals such as herbicides, pesticides and fertilizers are spread by agricultural self-propelled vehicles and tow-behind vehicles. Similarly, self-propelled and tow-behind vehicles in the construction industry spread liquid compounds used in highway surface treatment and water for dust control. In these examples, multiple tanks are common, and are connected by crossover fluid transfer assemblies. Crossover fluid transfer assemblies such as the crossover fuel assembly 120 described herein that are similarly connected to fluid carrying tanks provide the same protection from running out of such liquid.

The crossover fuel assembly 120 shown in FIG. 3 is composed of a check valve assembly 124, a first flexible polymeric tube 126, a suction tube assembly 128, a second flexible polymeric tube 130, a third flexible polymeric tube 132, left tank 112, right tank 116, and several clamping mechanisms 135 to join the components in fluid connection. Fuel is contained in each tank and in the crossover fuel assembly 120 which connects the tanks. As the vehicle moves over uneven ground, the rolling motion moves the fuel from the left tank to the right tank via the crossover fuel assembly 120.

The engine 104 sucks fuel from the crossover fuel assembly 120 through the fuel line 119. Fuel line 119 is connected to fuel intake pipe 118 of the suction tube assembly 128, which is adjacent to the check valve assembly 124. The check valve assembly limits the fuel flow away from the fuel intake pipe, thereby keeping fuel in the area of the suction tube assembly.

The left fuel tank 112, when filled, will transfer fuel through the crossover fuel assembly to the right fuel tank 116, filling both tanks simultaneously. Thus the check valve assembly 124 has an upstream end 134 and a downstream end 136. Similarly, the first flexible polymeric tube has a first end 138 and a second end 140, and the suction tube assembly has a first end 142 and a second end 144.

There are seven clamps 135 that couple each of the elements of the crossover fuel assembly 120 together. Clamps 135 extend circumferentially around the outer surface of each end of each polymeric tube in a continuous ring and compress each end of the polymeric tubes against the more rigid underlying structures of tanks 112 and 116, the suction tube assembly 128 and the check valve assembly 124. The clamps are preferably removable and replaceable to permit easy maintenance and repair. They are preferably screw-type hose clamps, as illustrated here, however other clamping mechanisms may be used. The flexible polymeric tubes (126, 130, and 132) are preferably elastomeric for best flexibility and durability in the rugged situations in which work vehicles are operated.

Figure 4:
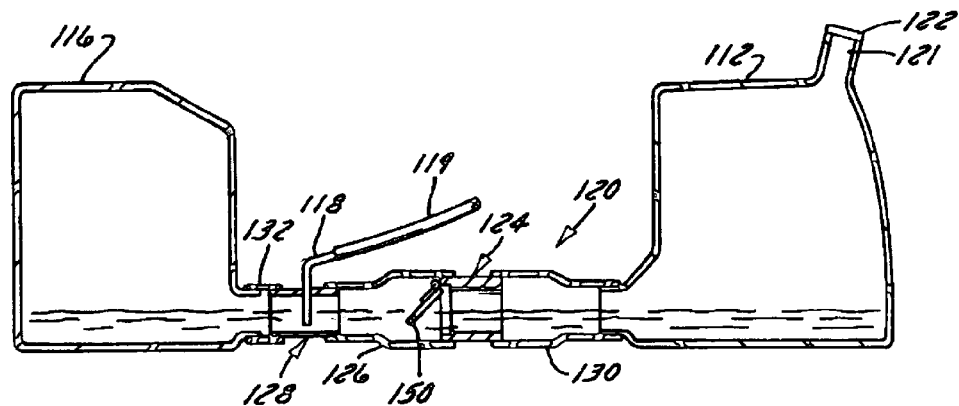
FIG. 4 is a front cross sectional view of the fuel system of FIGS. 1–3 containing fuel as it would be with the vehicle resting or travelling on level ground.

FIG. 4 demonstrates the location of fuel in the fuel system when the work vehicle is operating on level ground, with the level of fuel in the left tank 112, the crossover fuel assembly 120 and the right tank 116 being generally equal. The fuel intake pipe 118 is submerged in fuel, with the result that there is a continual flow of fuel to the engine. The weight of fuel acting on the upstream side of valve assembly 124 continually opens valve assembly 124 to permit automatic transfer of fuel from tank 112 to tank 116 as the engine sucks fuel from crossover fuel assembly 120, lowering the level of fuel in tank 116. The operator does not need to stop equipment operation until all the fuel is sucked up the fuel intake pipe, at which point the fuel tanks will be almost completely empty.

Figure 5:
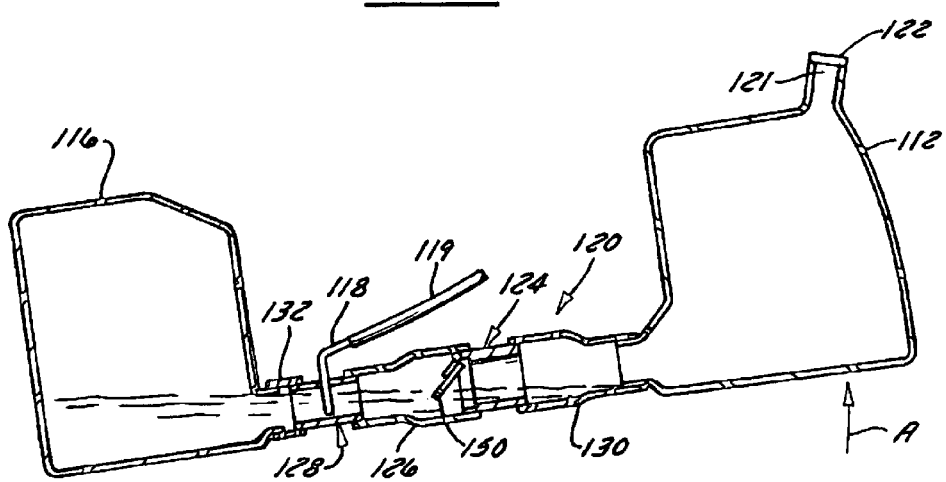
FIG. 5 is a front cross sectional view of the fuel system of FIGS. 1–3 containing fuel as it would be if the left side of the vehicle is raised.

When the left side of the vehicle moves upward, as shown with arrow A in FIG. 5, fuel will flow naturally from the left tank 112 through the crossover fuel assembly 120 to the right fuel tank 116, where the majority of the fuel will accumulate. Valve assembly 124 is configured such that this additional weight of fuel opens valve assembly 124. Since fuel intake pipe 118 is located nearer the right tank it is still submerged in fuel. Thus the engine will continue to receive fuel. Again, as on level ground, the operator can continue operating the vehicle, maintaining high operational efficiency, until almost all the fuel is consumed.

Figure 6:
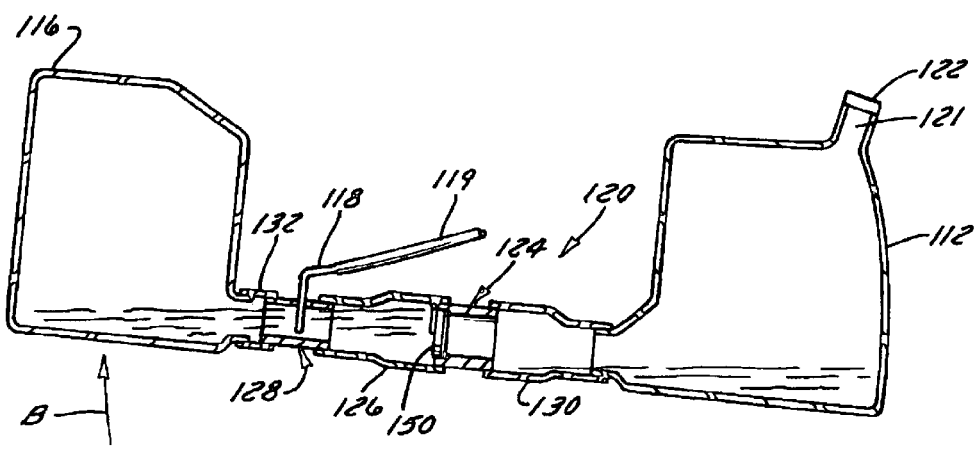
FIG. 6 is a front cross sectional view of the fuel system of FIGS. 1–3 containing fuel as it would be if the right side of the vehicle is raised.

FIG. 6, however, shows the situation when the right side of the vehicle is raised as shown by arrow B. A small amount of fuel accumulates in left tank 112 due to the natural flow of fuel downwards due to gravity or the crossover flow shown in FIG. 5. Due to check valve assembly 124 of the crossover fuel assembly 120 blocking fuel flow back to tank 112, the majority of the fuel is retained in the right tank 116 and in suction tube assembly 128 of crossover fuel assembly 120. Thus the engine continues to receive a steady flow of fuel because the fuel intake pipe remains in contact with fuel.

In the situation shown in FIG. 6, if the check valve function was not present in the crossover fuel assembly between the two fuel tanks, the operator would need to cease operation of the machine until the fuel tank was refilled with fuel or fuel valves were manually switched over from one tank to another.

Figure 7:
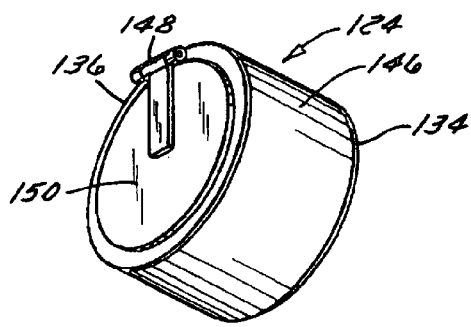
FIG. 7 is a perspective view of the valve assembly with the flap closed.
Figure 8:
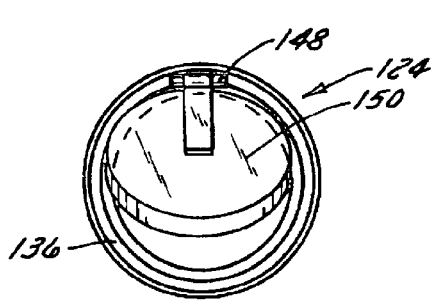
FIG. 8 is an end view of the valve assembly with the flap open.
Figure 9:
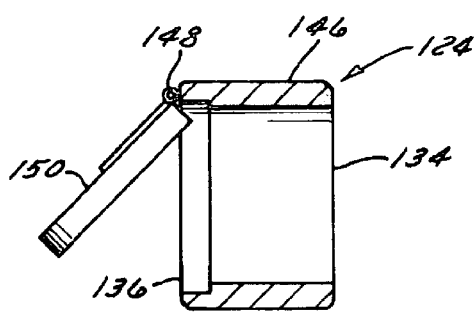
FIG. 9 is a cross sectional side view of the valve assembly with the flap open.

The check valve assembly 124 in FIGS. 7, 8, and 9 consists of a valve body, here shown as a first tube 146, a hinge 148, and a moveable valve element or flap 150. The hinge connects the flap pivotally to the first tube near the top of the downstream end 136 of the first tube.

FIG. 7 shows the check valve assembly 124 with the flap 150 in the closed position. This is the position when the right side tank is elevated higher than the left side tank. When the flap is closed, the check valve assembly 124 is said to be providing the check valve function.

FIG. 9 shows the check valve assembly with the flap in the open position. Fuel can easily pass from the upstream end 134 through the first tube 146 to the downstream end 136. The flow of fuel moves the flap from the closed position to the open position. The flow of fuel in the opposite direction (from downstream end 136 toward upstream end 134) pushes against the flap, moving the flap from the open position to the closed position, where flap 150 engages substantially the entire periphery of end 136, thereby blocking substantially all fuel flow back through tube 146 in an upstream direction, thus impeding the flow of fuel from the downstream end 136 to the upstream end 134 of the check valve assembly. This check valve function maintains a sufficient level of fuel in the fuel system near the fuel intake pipe as seen in FIG. 6.

The amount of fuel that remains in the left tank when the left tank is lower than the right tank and the check valve is in the closed position is determined by the style of check valve that is used and the maintained condition of the check valve. In the preferred embodiment, the check valve flap is connected to a hinge on top of the valve and relies on gravity to swing the flap from the open to the closed position. There are other valves well known in the art which provide a similar function. Other methods include a flap that is hinged on the bottom and has a floating element on the top section of the flap, such that liquid in the crossover assembly would keep the flap upright and closed, or a moving ball rather than a flap, with the ball moving into a narrow channel in a fashion that blocks the flow of fuel but is responsive to the motion of the fuel through the crossover assembly. The goal remains the same regardless of valve type implemented: to limit the fuel that is moving away from the fuel intake pipe and filling one of the two tanks.

Figure 10:
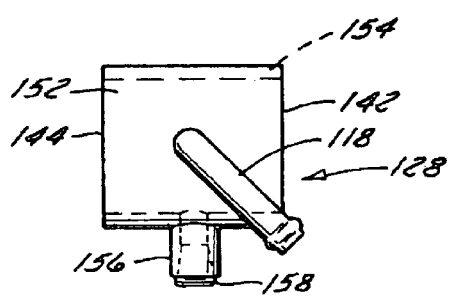
FIG. 10 is a top view of the suction tube assembly.
Figure 11:
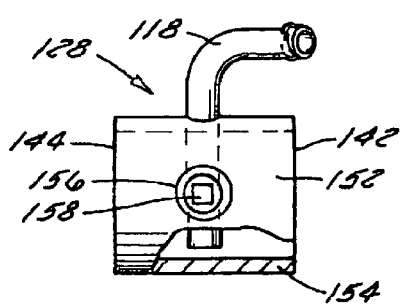
FIG. 11 is a fragmentary cross sectional rear view of the suction tube assembly.
Figure 12:
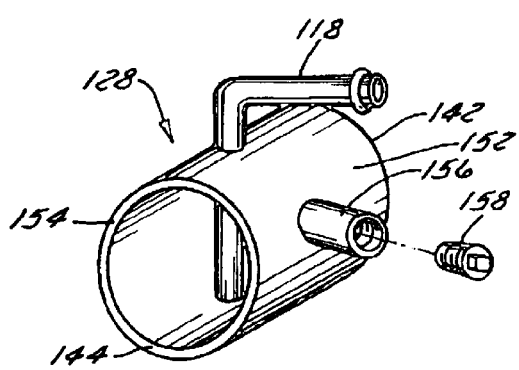
FIG. 12 is a perspective view of the suction tube assembly with the access port plug removed.

The suction tube assembly 128 shown in FIGS. 10, 11 and 12 consists of a second tube 152, a fuel intake pipe 118, an access port 156, and a port closure plug 158. The fuel intake pipe is fluidly connected to the tube wall 154 of the second tube. This connection is preferably disposed near the top of the second tube, and the fuel intake pipe preferably extends to a position adjacent to a lower point on the tube wall. However, the fuel intake pipe can also fluidly connect to the bottom of the tube wall, in which case it may or may not extend slightly upward into the second tube. There are several acceptable methods of fluidly connecting the fuel intake pipe to the second tube of the suction tube assembly well known to those skilled in the art. FIGS. 10, 11 and 12 show the preferable configuration where the fuel intake pipe connects to the top of the tube wall of the second tube.

An access port 156 is preferably provided in the tube wall of the second tube. This will allow easy drainage of fuel from the tanks before storage for long periods of time. Additionally, the access port can be used when cleaning sediment from the fuel system. During normal operation of the work vehicle, the access port will be closed with a closure plug 158. The closure plug is shown inserted into the access port in FIGS. 10 and 11. FIG. 12 shows the closure plug removed from the access port. The plug and port are preferably threaded with pipe threads, to facilitate a leak-free connection, however there are alternate connection methods including a press fit. A petcock may be used instead of a closure plug, and will provide similar functionality. By providing a drainage access port in the crossover tube assembly, a drainage port in the one or more fuel tanks is unnecessary, which saves manufacturing cost and increases reliability.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A crossover fuel assembly for uni-directional transfer of fuel between two tanks of a work vehicle comprising:
   a check valve assembly including a first tube, a hinge, and a flap, the first tube having two ends including an upstream end and a downstream end, the downstream end being closeable by the flap, the flap being pivotally connected to an upper point of the downstream end by the hinge, such that fuel flows through the first tube from the upstream end to the downstream end of the first tube;

a first flexible polymeric tube having a first end and a second end, the first end connected to the downstream end of the check valve assembly; and a suction tube assembly including a second tube and a fuel intake pipe, the second tube having first and second ends and a tube wall, the first end of the second tube being connected to the second end of the first flexible polymeric tube, wherein the fuel intake pipe is in communication with a hole in the tube wall.

2. The crossover fuel assembly of claim 1, wherein the fuel intake pipe enters the second tube at an upper point on the tube wall and the pipe extends adjacent to a lower point of the tube wall.

3. The crossover fuel assembly of claim 1, further comprising a second flexible polymeric tube connected to the upstream end of the first tube.

4. The crossover fuel assembly of claim 3, further comprising a third flexible polymeric tube connected to the second end of the second tube.

5. The crossover fuel assembly of claim 1, wherein the suction tube assembly further includes an access port and closure plug, the access port being located on the tube wall, and the closure plug being capable of insertion into the access port to close the port.

6. The crossover fuel assembly of claim 4, further comprising hose clamps, the hose clamps clamping the first flexible polymeric tube to the downstream end of the first tube, and clamping the first flexible polymeric tube to the first end of the second tube, and clamping the second flexible polymeric tube to the upstream end of the first tube, and clamping the third flexible polymeric tube to the second end of the second tube.

7. A fuel system for a work vehicle comprising:

a check valve assembly including a first tube, a hinge, and a flap, the first tube having two ends including an upstream end and a downstream end, the downstream end being closeable by the flap, the flap being pivotally connected to an upper portion of the downstream end by the hinge, such that fuel flows through the first tube from the upstream end to the downstream end of the first tube;

a first flexible polymeric tube having a first end and a second end, the first end connected to the downstream end of the first tube;

a suction tube assembly including a second tube and a fuel intake pipe, the second tube having first and second ends and a tube wall, the first end of the second tube being connected to the second end of the first flexible polymeric tube, wherein the fuel intake pipe is in communication with a hole in the tube wall; and first and second fuel tanks disposed laterally on the vehicle, the first fuel tank being in fluid communication with the suction tube assembly, the second fuel tank being in fluid communication with the check valve assembly.

8. The fuel system for a work vehicle of claim 7, wherein the fuel intake pipe enters the second tube at an upper point on the tube wall and the pipe extends adjacent to a lower point of the tube wall.

9. The fuel system for a work vehicle of claim 7, further comprising a second flexible polymeric tube connected to the upstream end of the first tube.

10. The fuel system for a work vehicle of claim 9, further comprising a third flexible polymeric tube connected to the second end of the second tube.

11. The fuel system for a work vehicle of claim 7, wherein the suction tube assembly further includes an access port adapted to receive a closure plug.

12. The fuel system for a work vehicle of claim 10, further comprising hose clamps, the hose clamps clamping the first tank to the second flexible polymeric tube, the second flexible polymeric tube to the check valve assembly, the check valve assembly to the first flexible polymeric tube, the first flexible polymeric tube to the suction tube assembly, the suction tube assembly to the third flexible polymeric tube, and the third flexible polymeric tube to the second tank.

13. A work vehicle comprising:

a chassis;

an engine mounted on the chassis;

a plurality of wheels supporting the chassis, including left front, left rear, right front, and right rear wheels;

a first fuel tank and a second fuel tank, wherein one of the fuel tanks is disposed between the left front and left rear wheels, and the other of the fuel tanks is disposed between the right front and right rear wheels; and a crossover fuel assembly coupled to the first and second fuel tanks, the crossover fuel assembly including a check valve assembly in fluid communication with a suction tube assembly, wherein the suction tube assembly includes a fuel intake pipe fluidly coupled to the engine and the suction tube assembly further includes an access port and a closure plug, the access port being threadedly engaged with the closure plug.

14. The work vehicle of claim 13, wherein the first and second tanks, the suction tube assembly and the check valve assembly are clamped together.

15. The work vehicle of claim 14, wherein the first and second tanks, the suction tube assembly and the check valve assembly are clamped together with hose clamps.

16. The work vehicle of claim 13, wherein the check valve assembly substantially blocks the flow of liquid from the first tank to the second tank.

17. A work vehicle comprising:

a chassis;

an engine mounted on the chassis;

a plurality of wheels supporting the chassis, including left front, left rear, right front, and right rear wheels;

a first fuel tank and a second fuel tank, wherein one of the fuel tanks is disposed between the left front and left rear wheels, and the other of the fuel tanks is disposed between the right front and right rear wheels;

a crossover fuel assembly coupled to the first and second fuel tanks, the crossover fuel assembly including a check valve assembly in fluid communication with a suction tube assembly;

a first polymeric tube coupled to and between the check valve assembly and the suction tube assembly; and a second polymeric tube coupled to and between the first tank and the check valve assembly.

18. The work vehicle of claim 17, further comprising a third polymeric tube coupled to and between the suction tube assembly and the second fuel tank.

* * * * *